(12) United States Patent
Mahmoodian et al.

(10) Patent No.: US 12,514,984 B2
(45) Date of Patent: Jan. 6, 2026

(54) SYRINGE TIP CAP

(71) Applicant: Becton, Dickinson and Company, Franklin Lakes, NJ (US)

(72) Inventors: Roza Mahmoodian, New York, NY (US); Paul P. Marici, Piscataway, NJ (US); Nicholas Erekovcanski, Butler, NJ (US); Shoshana San Solo, New York, NY (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 986 days.

(21) Appl. No.: 17/624,414

(22) PCT Filed: Jul. 8, 2020

(86) PCT No.: PCT/US2020/041097
§ 371 (c)(1),
(2) Date: Jan. 3, 2022

(87) PCT Pub. No.: WO2021/011244
PCT Pub. Date: Jan. 21, 2021

(65) Prior Publication Data
US 2022/0273881 A1 Sep. 1, 2022

Related U.S. Application Data

(60) Provisional application No. 62/873,412, filed on Jul. 12, 2019.

(51) Int. Cl.
*A61M 5/31* (2006.01)
*A61M 5/32* (2006.01)
*A61M 5/50* (2006.01)

(52) U.S. Cl.
CPC ............ *A61M 5/31* (2013.01); *A61M 5/3202* (2013.01); *A61M 5/3204* (2013.01); *A61M 5/50* (2013.01);
(Continued)

(58) Field of Classification Search
CPC ........ A61M 5/31; A61M 5/50; A61M 5/3204; A61M 5/3202; A61M 2005/3104; A61M 2005/3117; A61M 2205/586
See application file for complete search history.

(56) References Cited

U.S. PATENT DOCUMENTS 4,597,758 A 7/1986 Aalto et al.
4,711,363 A 12/1987 Marino
(Continued)

FOREIGN PATENT DOCUMENTS

CA 2523133 C 2/2013
CN 1322119 A 11/2001
(Continued)

OTHER PUBLICATIONS

"Ruhof Dry Sponges", Ruhof, Sep. 30, 2016, https://www.ruhof.com/products/ruhof-dry-sponges (Year: 2016).

*Primary Examiner* — Tasnim Mehjabin Ahmed
(74) *Attorney, Agent, or Firm* — Servilla Whitney LLC (57) ABSTRACT

Syringe tip caps are described herein. Such syringe tip caps may include a distal wall, a side wall extending proximally from the distal wall to define a chamber, the chamber configured to surround an elongate tip of a syringe. The distal wall may be attached to the sidewall via a hinge.

14 Claims, 9 Drawing Sheets

(52) U.S. Cl.
CPC ............... *A61M 2005/3104* (2013.01); *A61M 2005/3117* (2013.01); *A61M 2205/586* (2013.01)

(56) References Cited

U.S. PATENT DOCUMENTS

| | | | |
|---|---|---|---|
| 4,738,376 | A | 4/1988 | Markus |
| 5,496,288 | A * | 3/1996 | Sweeney ............... A61M 5/178 220/254.3 |
| 5,676,406 | A | 10/1997 | Simmons et al. |
| 6,394,983 | B1 * | 5/2002 | Mayoral ............... A61M 39/20 604/905 |
| 6,632,199 | B1 | 10/2003 | Tucker et al. |
| 8,388,894 | B2 | 3/2013 | Colantonio |
| 8,715,231 | B2 | 5/2014 | Woehr |
| 8,721,627 | B2 | 5/2014 | Alpert et al. |
| 8,777,504 | B2 | 7/2014 | Shaw et al. |
| 9,039,989 | B2 | 5/2015 | Liu et al. |
| 9,132,223 | B1 | 9/2015 | Al Wakeel |
| 9,192,449 | B2 | 11/2015 | Kerr et al. |
| 10,099,048 | B2 | 10/2018 | Chiu et al. |
| 10,166,381 | B2 | 1/2019 | Gardner et al. |
| 10,376,686 | B2 | 8/2019 | Burkholz et al. |
| 10,871,246 | B2 | 12/2020 | Marici et al. |
| 11,353,147 | B2 | 6/2022 | Marici |
| 11,511,100 | B2 | 11/2022 | Ryan |
| 11,628,288 | B1 | 4/2023 | Solomon et al. |
| 2003/0144647 | A1 | 7/2003 | Miyahara |
| 2004/0039341 | A1 | 2/2004 | Ranalletta |
| 2004/0044318 | A1 | 3/2004 | Fiser et al. |
| 2005/0147525 | A1 | 7/2005 | Bousquet |
| 2005/0197646 | A1 | 9/2005 | Connell et al. |
| 2007/0060904 | A1 | 3/2007 | Vedrine et al. |
| 2007/0129705 | A1 | 6/2007 | Trombley, III et al. |
| 2008/0010766 | A1 | 1/2008 | Kaufman et al. |
| 2010/0049170 | A1 | 2/2010 | Solomon et al. |
| 2010/0050351 | A1 | 3/2010 | Colantonio et al. |
| 2011/0046603 | A1 | 2/2011 | Felsovalyi et al. |
| 2011/0054440 | A1 | 3/2011 | Lewis |
| 2011/0264037 | A1 | 10/2011 | Foshee et al. |
| 2012/0039764 | A1 | 2/2012 | Solomon et al. |
| 2012/0109073 | A1 | 5/2012 | Anderson et al. |
| 2012/0123386 | A1 * | 5/2012 | Tsals ................ A61M 5/3287 604/506 |
| 2012/0210678 | A1 | 8/2012 | Alcouloumre et al. |
| 2012/0302997 | A1 | 11/2012 | Gardner et al. |
| 2013/0085474 | A1 | 4/2013 | Charles et al. |
| 2013/0171030 | A1 | 7/2013 | Ferlic et al. |
| 2013/0197485 | A1 * | 8/2013 | Gardner ............... A61M 39/162 604/533 |
| 2013/0338644 | A1 | 12/2013 | Solomon et al. |
| 2014/0052074 | A1 | 2/2014 | Tekeste |
| 2014/0150832 | A1 | 6/2014 | Rogers et al. |
| 2014/0201910 | A1 | 7/2014 | Rand et al. |
| 2014/0366914 | A1 | 12/2014 | Kerr et al. |
| 2015/0011936 | A1 * | 1/2015 | Okihara ............... A61M 5/344 604/111 |
| 2015/0094666 | A1 | 4/2015 | Bates et al. |
| 2015/0374968 | A1 | 12/2015 | Solomon et al. |
| 2016/0045629 | A1 | 2/2016 | Gardner et al. |
| 2017/0203087 | A1 | 7/2017 | Ryan et al. |
| 2017/0203092 | A1 | 7/2017 | Ryan et al. |
| 2018/0085568 | A1 | 3/2018 | Drmanovic |
| 2018/0200145 | A1 | 7/2018 | Sanders et al. |
| 2018/0200500 | A1 | 7/2018 | Ziebol et al. |
| 2018/0214684 | A1 | 8/2018 | Avula et al. |
| 2018/0237190 | A1 | 8/2018 | Iwasaki |
| 2018/0256879 | A1 | 9/2018 | Chiu et al. |
| 2018/0256881 | A1 | 9/2018 | Hitchcock et al. |
| 2018/0256883 | A1 | 9/2018 | Follman et al. |
| 2019/0001115 | A1 | 1/2019 | Ma et al. |
| 2019/0099593 | A1 | 4/2019 | Avula et al. |
| 2019/0151643 | A1 | 5/2019 | Alpert |
| 2019/0234540 | A1 | 8/2019 | Marici et al. |
| 2019/0308006 | A1 | 10/2019 | Erekovcanski et al. |
| 2019/0351212 | A1 | 11/2019 | Dudar et al. |
| 2020/0147360 | A1 | 5/2020 | Arnett et al. |
| 2021/0100996 | A1 | 4/2021 | Wijesuriya et al. |
| 2021/0187267 | A1 | 6/2021 | Jiang |
| 2022/0273931 | A1 | 9/2022 | Jiang et al. |
| 2023/0080687 | A1 | 3/2023 | Ryan |

FOREIGN PATENT DOCUMENTS

| | | |
|---|---|---|
| CN | 101535701 A | 9/2009 |
| CN | 201807018 U | 4/2011 |
| CN | 102188766 A | 9/2011 |
| CN | 102448502 A | 5/2012 |
| CN | 103083767 A | 5/2013 |
| CN | 204161736 U | 2/2015 |
| CN | 206198472 U | 5/2017 |
| CN | 214388299 U | 10/2021 |
| CN | 215653405 U | 1/2022 |
| CN | 216022674 U | 3/2022 |
| CN | 216258735 U | 4/2022 |
| DE | 20017013 U1 | 12/2000 |
| DE | 10247963 A1 | 5/2004 |
| EP | 0589379 A1 | 3/1994 |
| EP | 2606930 A1 | 6/2013 |
| EP | 2832391 A1 | 2/2015 |
| EP | 3275490 A1 | 1/2018 |
| GB | 2408259 A | 5/2005 |
| GB | 2518646 A | 4/2015 |
| JP | S5841561 A | 3/1983 |
| JP | H03139363 A | 6/1991 |
| JP | H04501672 A | 3/1992 |
| JP | 2001502191 A | 2/2001 |
| JP | 2001521792 A | 11/2001 |
| JP | 2004208740 A | 7/2004 |
| JP | 2008239164 A | 10/2008 |
| JP | 2008253775 A | 10/2008 |
| JP | 2009526241 A | 7/2009 |
| JP | 2013509274 A | 3/2013 |
| JP | 2013252165 A | 12/2013 |
| JP | 2014532517 A | 12/2014 |
| JP | 2016511111 A | 4/2016 |
| JP | 2016511119 A | 4/2016 |
| JP | 2016104214 A | 6/2016 |
| JP | 2019531814 A | 11/2019 |
| WO | 0019878 | 4/2000 |
| WO | 200024442 A1 | 5/2000 |
| WO | 200224551 A1 | 3/2002 |
| WO | 2011066586 A1 | 6/2011 |
| WO | 2012144026 A1 | 10/2012 |
| WO | 2013046857 A1 | 4/2013 |
| WO | 2015004728 A1 | 1/2015 |
| WO | 2016158144 A1 | 10/2016 |
| WO | 2017087400 A1 | 5/2017 |
| WO | 2018106508 A1 | 6/2018 |
| WO | 2018237090 A1 | 12/2018 |
| WO | 2019147906 A1 | 8/2019 |
| WO | 2019152482 A1 | 8/2019 |
| WO | 2020056120 A1 | 3/2020 |
| WO | 2020112767 A1 | 6/2020 |

\* cited by examiner

SYRINGE TIP CAP

CROSS-REFERENCE TO RELATED APPLICATIONS

This application is the National Stage entry of PCT/US2020/041097, filed on Jul. 8, 2020, which claims priority to U.S. Provisional Application Ser. No. 62/873,412, filed Jul. 12, 2019, the entire disclosures of which are hereby incorporated by reference herein.

TECHNICAL FIELD

The present disclosure generally relates to syringe tip caps comprising a physical barrier for securely sealing the tip of a hypodermic syringe barrel, preventing contact of the syringe tip with the surrounding non-sterile environment and allowing for one-handed removal of a syringe tip cap.

BACKGROUND

Currently available prefilled syringe tip caps in the market require the use of two hands to remove the tip cap. During clinical use, requirement of two hands may lead to complications. Because after removal of the tip cap, the catheter that the syringe will be connected to needs to be disinfected with a medical device (such as an alcohol swab), therefore, members of the medical staff are already using one of their hands when the syringe tip needs to be removed. A syringe tip cap offering a one-handed opening mechanism would help ease the workflow.

Currently existing syringe tip caps have threaded connections which makes one handed opening and removal of the existing tip caps either difficult or impossible. Therefore, currently existing syringe tip caps require two hands for operation: one hand for holding a syringe and the second hand for cap removal. Conventional flush syringes have a barrel with a luer tip at one end which may be exposed to the non-sterile environment once the syringe tip is removed from a tip cap thus providing an opportunity for undesired contamination. Consequently, there is a need for a syringe tip cap, providing a physical barrier around the syringe tip which promotes aseptic practice by reducing or eliminating "touch" contamination of the syringe, particularly the tip of a syringe, with the surrounding non-sterile environment. There is also a need for a syringe tip cap which allows the clinician to open the protective syringe tip cap with one hand, without the operating hand being in close proximity of the syringe tip. In addition to enhanced safety, such a one-handed operation would greatly improve workflow and efficiency.

SUMMARY

One aspect of the present disclosure pertains to a syringe tip cap including a body having a annular side wall having an inside surface defining a chamber, an open proximal end, a closed distal end including a distal wall, a protruding boss having a finger contact surface, and a collar disposed on an inner surface of the distal wall having an internal dimension for mating with a distal tip of a syringe.

In one or more embodiments, the chamber is configured to surround an elongated tip of a syringe.

In one or more embodiments, the collar includes one or more tapered projecting sidewalls.

In one or more embodiments, the annular side wall includes one or more tapers.

In one or more embodiments, the finger contact surface has a stepped, scalloped or graded configuration to improve grip.

A second aspect of the present disclosure pertains to a syringe tip cap including a body having a annular side wall having an inside surface defining a chamber, an open proximal end, a closed distal end including a distal wall, a protruding boss having a finger contact surface, a finger stop disposed on the protruding boss, and a collar disposed on an inner surface of the distal wall having an internal dimension for mating with a distal tip of a syringe.

In one or more embodiments, the finger stop is disposed on the protruding boss at the distal end of the body of the tip cap.

In one or more embodiments, the finger stop is disposed along the length of protruding boss near the center of protruding boss.

A third aspect of the present disclosure pertains to a syringe tip cap including a body having a distal end including a distal wall, a side wall extending proximally from the distal wall having an inside surface defining a chamber for receiving an elongate tip of a syringe an open proximal end, a lid, a hinge attaching the lid to the sidewall, and a locking element that engages with a corresponding mating locking projection on the cap.

In one or more embodiments, the hinge is a living hinge.

In one or more embodiments, the hinge is a butterfly shape with a central hinge section and two lateral wings.

In one or more embodiments, the locking element is shaped in a form of an arm or recess.

In one or more embodiments, the hinge opens between a fully closed position to a fully open position of at least 120 degrees.

DETAILED DESCRIPTION

Before describing several exemplary embodiments of the present disclosure, it is to be understood that the disclosure is not limited to the details of construction or process steps set forth in the following description. The disclosure is capable of other embodiments and of being practiced or being carried out in various ways.

With respect to terms used in this disclosure, the following definitions are provided.

Reference to "pre-filled syringe assembly" includes syringes which have barrels filled prior to delivery to the user with a solution or medicament during or after the assembly of the syringe using sterile filling methods. Pre-filled syringe assembly include syringe assemblies are indicated for use in the flushing of vascular access devices (VADs).

As used herein, the use of "a," "an," and "the" includes the singular and plural.

As used herein, the term "Luer connector" refers to a connection collar that is the standard way of attaching syringes, catheters, hubbed needles, IV tubes, etc. to each other. The Luer connector consists of male and female interlocking tubes, slightly tapered to hold together better with even just a simple pressure/twist fit. Luer connectors can optionally include an additional outer rim of threading, allowing them to be more secure. The Luer connector male end is generally associated with a flush syringe and can interlock and connect to the female end located on the VAD. A Luer connector comprises a distal end, a proximal end, an irregularly shaped outer wall, a profiled center passageway for fluid communication from the chamber of the barrel of a syringe to the hub of a VAD. A Luer connector also has a distal end channel that releasably attaches the Luer connector to the hub of a VAD, and a proximal end channel that releasably attaches the Luer connector to the barrel of a syringe.

Clinicians need to handle multiple components while accessing an intravenous (IV) line or catheter as they are required to open and disinfect the hub, open the syringe, hold the line in place, etc. while ensuring that none of the devices touch any surfaces as this would lead to contamination and blood stream infections which can have deadly outcomes. Therefore, accessing an intravenous (IV) line or catheter is not straightforward and requires a certain level of dexterity to carry out the procedure while preventing the syringe tip from coming into contact with the surrounding environment. If the syringe tip touches any non-sterile surfaces, "touch" contamination can occur which can cause microbial growth in the IV line and consequently lead to incidents of catheter-associated-bloodstream infection ("CRBSI") and central line-associated bloodstream infection ("CLABSI") which are very costly and lethal.

Embodiments of the present disclosure relate to a syringe tip caps surrounding an elongate distal tip of a syringe, including pre-filled syringe assemblies. The collar provides a physical barrier around the syringe tip.

Referring to FIGS. 1-7, a syringe tip cap 10 according to a first aspect of the present disclosure generally comprises a body having an annular side wall 12 having an inside surface 14 defining a chamber 16 configured to accept a luer connector 52 of a syringe 50, an open proximal end 18 and a distal end 20 having a distal wall 22, a protruding boss 24 having a finger contact surface 26.

Figure 1:
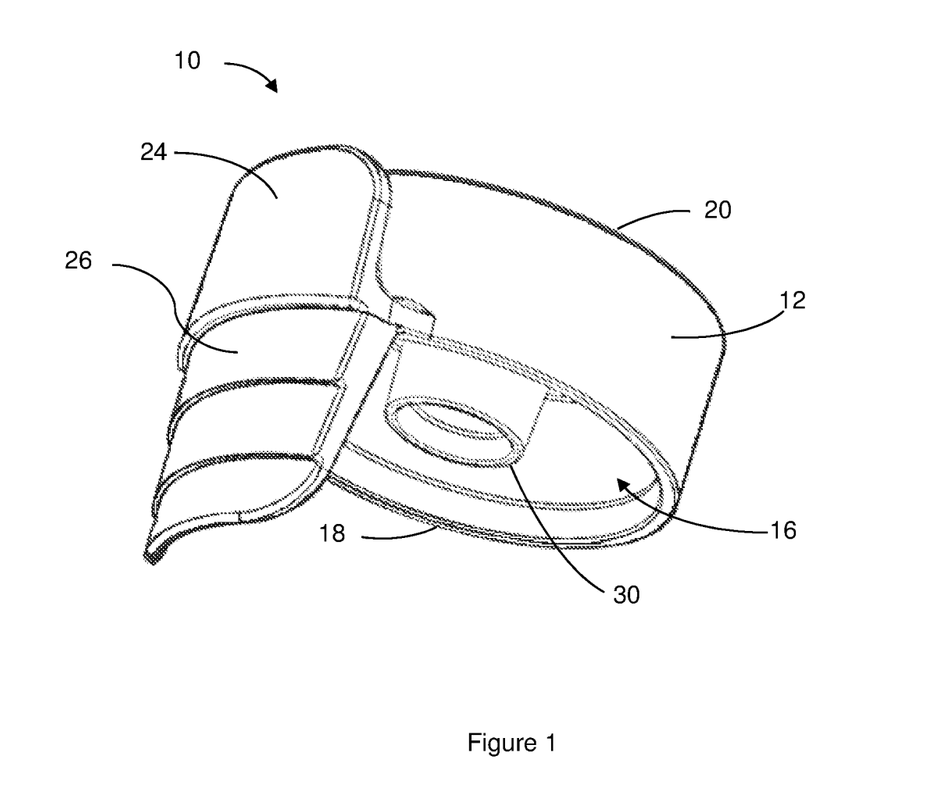
FIG. 1 illustrates a perspective view of a syringe tip cap in accordance with a first embodiment of the present disclosure.
Figure 2:
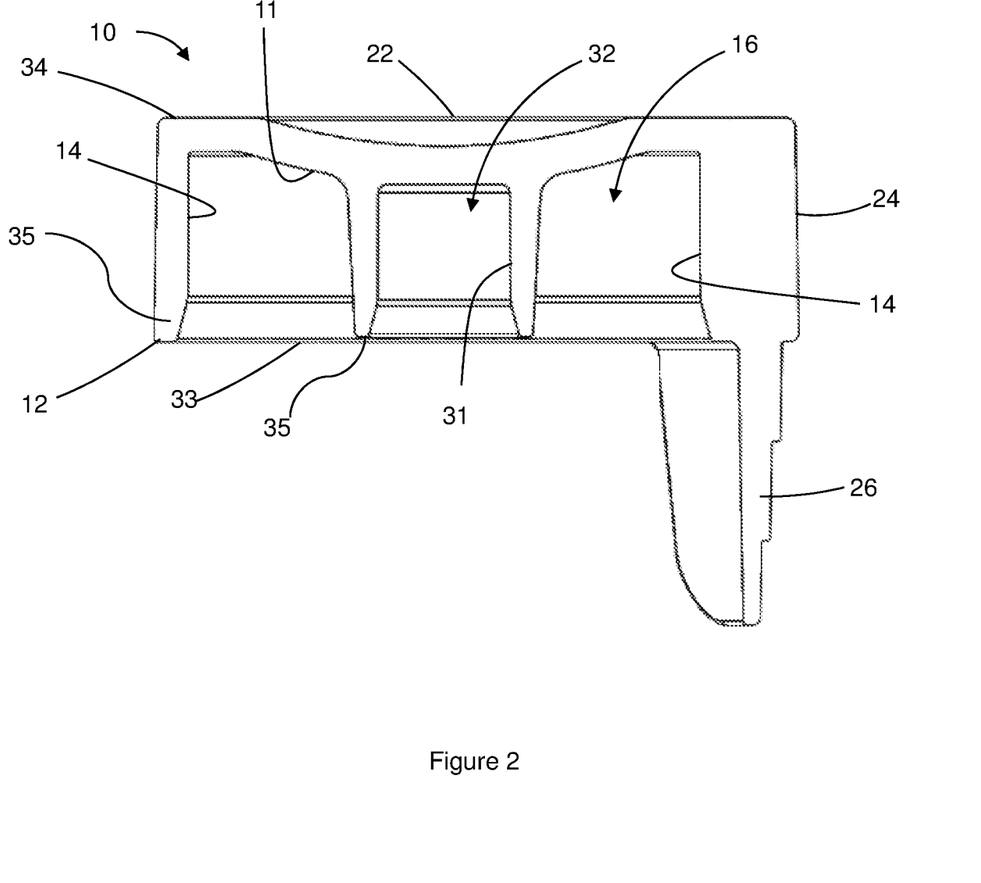
FIG. 2 illustrates a cross-sectional view of a syringe tip cap in accordance with a first embodiment of the present disclosure.
Figure 3:
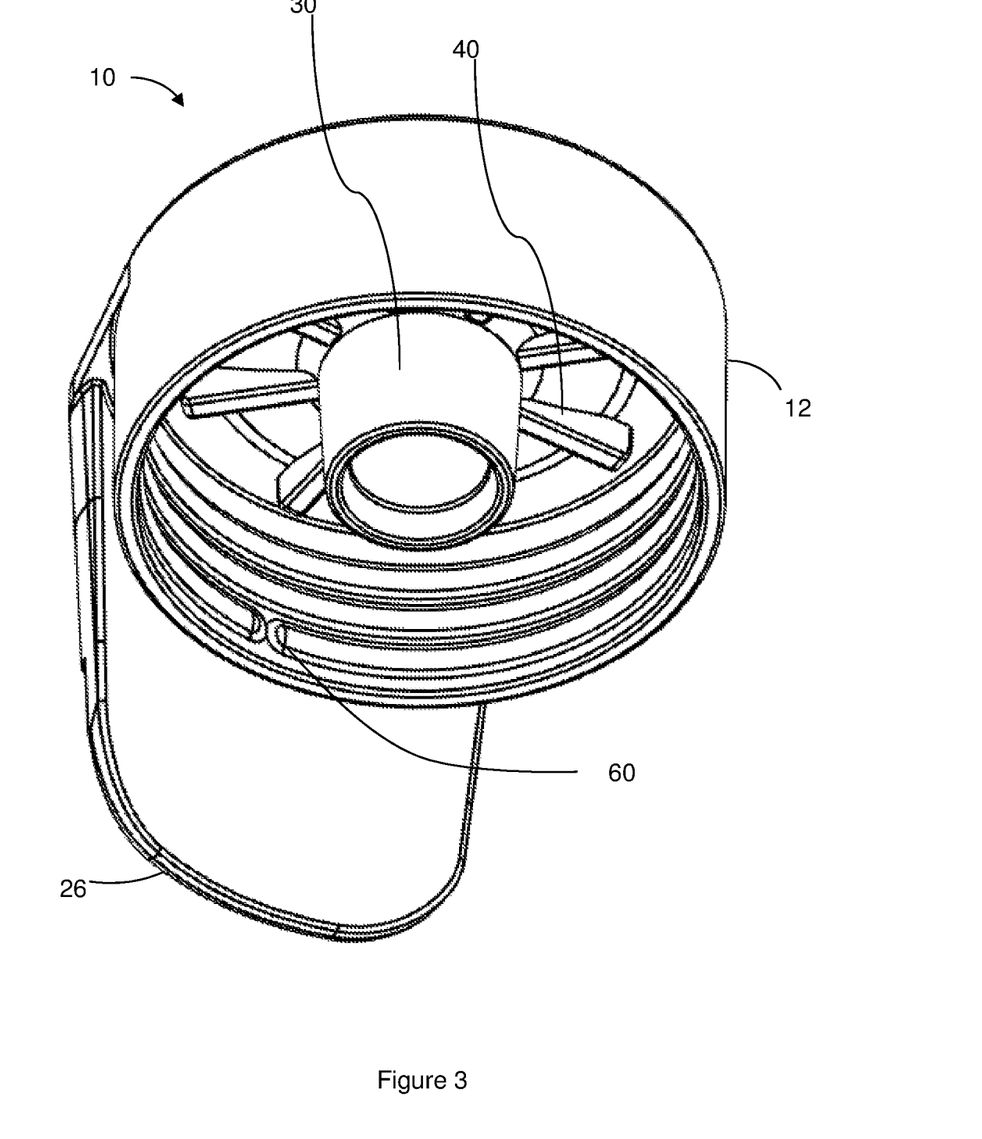
FIG. 3 illustrates a perspective view of an alternate embodiment of the syringe tip cap shown in FIG. 1.

As shown in FIGS. 1-3, distal wall 22 includes a centrally situated collar 30 having a projecting side wall 31 forming an inside cavity 32 configured to envelop around an elongated tip 54 of a syringe 50, an open proximal end 33, and a distal end 34 adjacent the distal wall 22 of the tip cap 10. In one or more embodiments, the collar 30 is an outwardly extending protrusion from the inside surface 11 of the distal wall 22 of the tip cap 10. In one or more embodiments, collar 30 is adapted for connection to an elongated tip or hub of a vascular access device.

Figure 5:
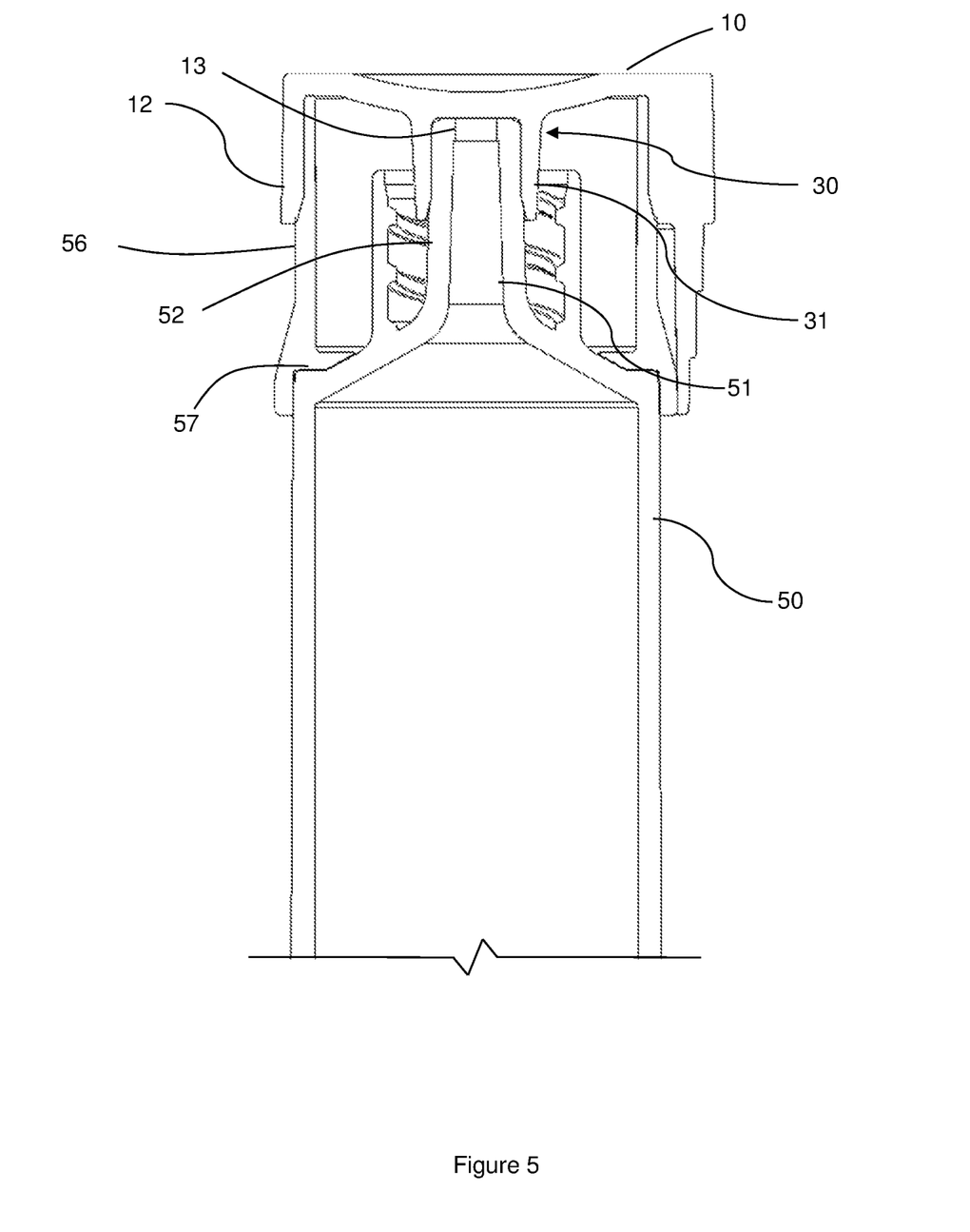
FIG. 5 illustrates a cross-sectional view of a syringe tip cap in accordance with the first embodiment of the present disclosure disposed over a syringe.

As shown in FIGS. 2 and 5, the chamber 16 is configured to accept a luer connector 52 of the syringe 50 and the inside cavity 32 configured to envelop around an elongated tip 54 of the syringe 50. Specifically, projecting sidewalls 31 of collar 30 are configured to come into contact with the elongated tip 54 of the syringe 50. In one or more embodiments, the projecting sidewalls 31 create an interference fit with the elongated tip 54. In one or more embodiments, the projecting sidewalls 31 fluidly seal the elongated tip 54. The inside surface 14 of the annular sidewall 12 is configured to come into contact with an outer collar 56 of the syringe 50, the outer collar extending from a distal wall 57 of the syringe. In one or more embodiments, inside surface of the annular sidewall 12 creates an interference fit with the elongated tip 54. In one or more embodiments, the projecting sidewalls 31 fluidly seal the elongated tip 54.

In one or more embodiments, syringe tip cap further includes a protrusion 13 in the shape of a centrally situated pin or button. The protrusion 13 is disposed on the inside surface 11 of the distal wall 22 and extends proximally into the inside cavity 32. The protrusion 13 is sized and configured to fluidly block a lumen 55 of the elongated tip 54 of the syringe 540. In one or more embodiments, the protrusion 13 has a diameter equal to or slightly larger than a diameter of the lumen 55 of the elongated tip 54, thereby fluidly covering the lumen 55. In one or more embodiments, the protrusion 13 has a diameter equal to or slightly less than a diameter of the lumen 55 of the elongated tip 54 and the protrusion 13 is configured to protrude slightly into the lumen 55, thereby fluidly sealing the lumen 55 by making contact with an inner surface of the lumen 55.

As shown in FIGS. 2 and 5, collar 30 seals the distal tip 51 of a syringe assembly 50 and prevents leakage when tip cap 10 is placed on the distal tip of a syringe assembly. The collar 30 prevents leakage after the syringe is filled and the cap 10 is closed until the cap 10 is opened prior to use. In one or more embodiments, as shown in FIGS. 2 and 5, the projecting side walls 31 of collar 30 may be tapered, orientated, configured and/or shaped to allow collar 30 to seal an opening of a distal elongated tip of a syringe or syringe assembly. Because of its shape, as shown in FIGS. 2 and 5, the tapered proximal end of the sidewall 31 of collar 30 helps facilitate the alignment of a distal tip of a syringe and thus reduce the chances of "touch" contamination. Collar 30 aids in aligning the elongated tip to other luer devices, such as needleless connectors, and protects the elongated tip from touch contamination. Absent the embodiments of the present disclosure, alignment of luer tips require careful attention and visual precision for being able to align the tip cap and the distal tip of the syringe perfectly such that no contamination occurs.

As seen in FIGS. 1-3 and 5, the projecting sidewalls 31 of collar 30 have a tapered proximal end 35 resulting in a tapered seal. As seen in FIGS. 2 and 5, the entrance angle of the tapered projecting sidewalls 31 of collar 30 and the entrance angle of the tapered interior wall surface of the annular sidewall of the tip cap produce a tapered seal between the tip cap and the distal end of the syringe 50, as well as, the barrel of the syringe. In one or more embodiments, the elongated tip of the syringe may be a luer tip. These seals ensure that both the interior cavity of the tip cap and distal end of the syringe are sterile and that the syringe is capped ensuring the pre-filled fluid of the syringe barrel is contained. This type of seal also makes one-handed removal feasible when combined with a "push off mechanism" that the user will use to remove the cap as described below.

In one or more embodiments, the internal diameter and taper angles of the tapered projecting sidewalls 31 of collar 30 and the tapered interior wall surface of the annular sidewall 12 of the tip cap 10 may be varied to affect interference fit with a syringe and thus improve the seal efficacy.

Tapered projecting sidewalls 31 of collar 30 and the tapered interior wall surface of the annular sidewall 12 of the tip cap 10 ensure that the tip cap 10 can be removed by pushing off rather than unscrewing which is required when threads are involved. Depending on the interfaces on these surfaces, seals can be generated to ensure that entire area contained in the cavity 32 of the collar and chamber 16 of the tip cap 10 maintains container closure integrity.

Protruding boss 24 includes a finger contact surface 26 that extends from the annular sidewall 12 of the tip cap 10 away from the annular sidewall 12, the finger contact 26 is configured for applying digital force to the finger contact surface 26 to allow the single-handed movement of the tip cap 10 from a closed sealed position to an open unsealed position to remove the tip cap from the barrel of the syringe. This is accomplished single-handedly by holding the syringe assembly sealed with tip cap 10 in one hand and applying a digital force to the finger contact surface 26 in a distal direction with the thumb or the index finger of the holding hand. In one or more embodiments, as shown in FIGS. 1 and 2, the finger contact surface may have a stepped, scalloped or graded configuration to improve grip configuration to improve grip when the user places a finger on the finger contact surface.

In one or more alternate embodiments, as seen in FIG. 3, wedges or ribs 40 may be disposed on the inside surface of the distal wall 22 in an outwardly extending orientation from the collar to the inside surface of the annular wall 12. As shown in FIG. 3, wedges or ribs 40 may be arranged in hub and spoke fashion relative to the collar to resemble a small umbrella. Wedges or ribs 40 provide structural integrity to tip cap 10 and also help improve interference or friction fit with a distal end of syringe barrel and/or luer tip, such that, the frictional force due to the interference or friction fit will be greater than the forces applied to the tip cap 10 during any of the processes after the assembly (such as sterilization, shipping and handling etc.). In one or more embodiments, tip cap 10 can additionally include a gasket 60 on the inside surface of annular sidewall 12 of tip cap or on the exterior surface of collar 30 to create a tight seal for maintaining sterility.

Figure 4:
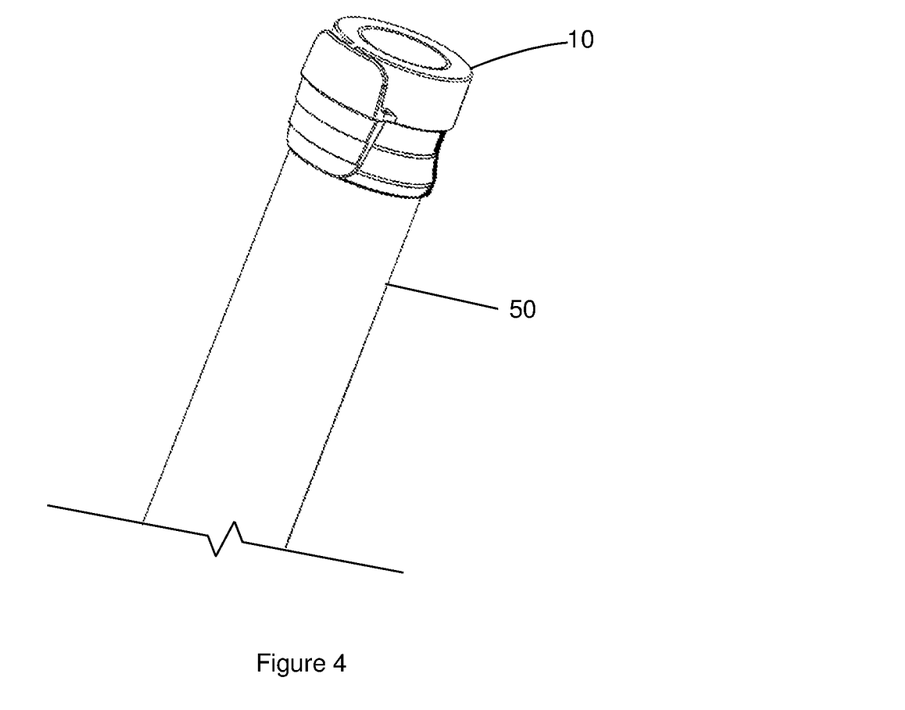
FIG. 4 illustrates a perspective view of a syringe tip cap in accordance with the first embodiment of the present disclosure disposed over a syringe.

As shown in FIGS. 4 and 5, tip cap 10 will have an interference or friction fit with a distal end of syringe barrel and/or luer tip, such that, the frictional force due to the interference or friction fit will be greater than the forces applied to the tip cap 10 during any of the processes after the assembly (such as sterilization, shipping and handling etc.). Yet, the frictional force will still be reasonably low so that users will be able to remove it with a single hand, such as, with the push of a thumb.

The material of the tip cap 10 has to be hard enough to retain its structural integrity when the tip cap is pushed axially during opening, and not bend or buckle. The syringe 50, tip cap 10 and collar 30 may be fabricated from suitable medical grade materials including polymers or metals. Preferably, tip cap 10 and collar 30 are injection-molded using a thermoplastic and/or thermoplastic elastomer (TPE).

Figure 8:
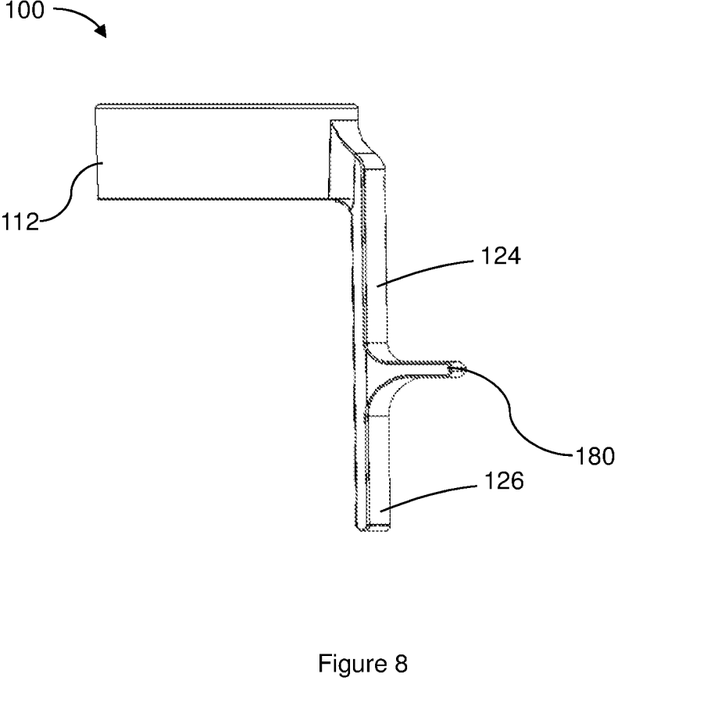
FIG. 8 illustrates a side view of a syringe tip cap in accordance with a second embodiment of the present disclosure.
Figure 9:
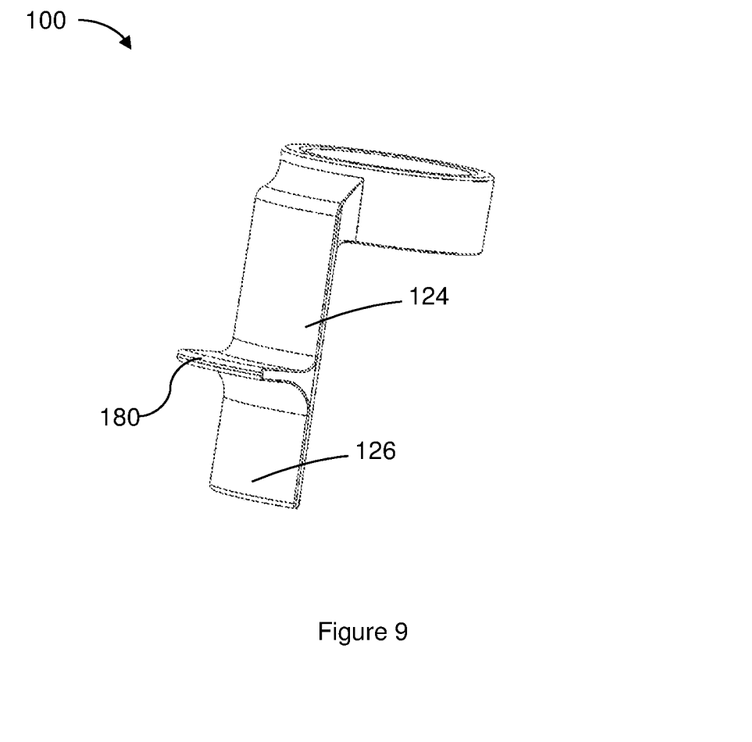
FIG. 9 illustrates a perspective view of the syringe tip cap in accordance with the second embodiment of the present disclosure.
Figure 10:
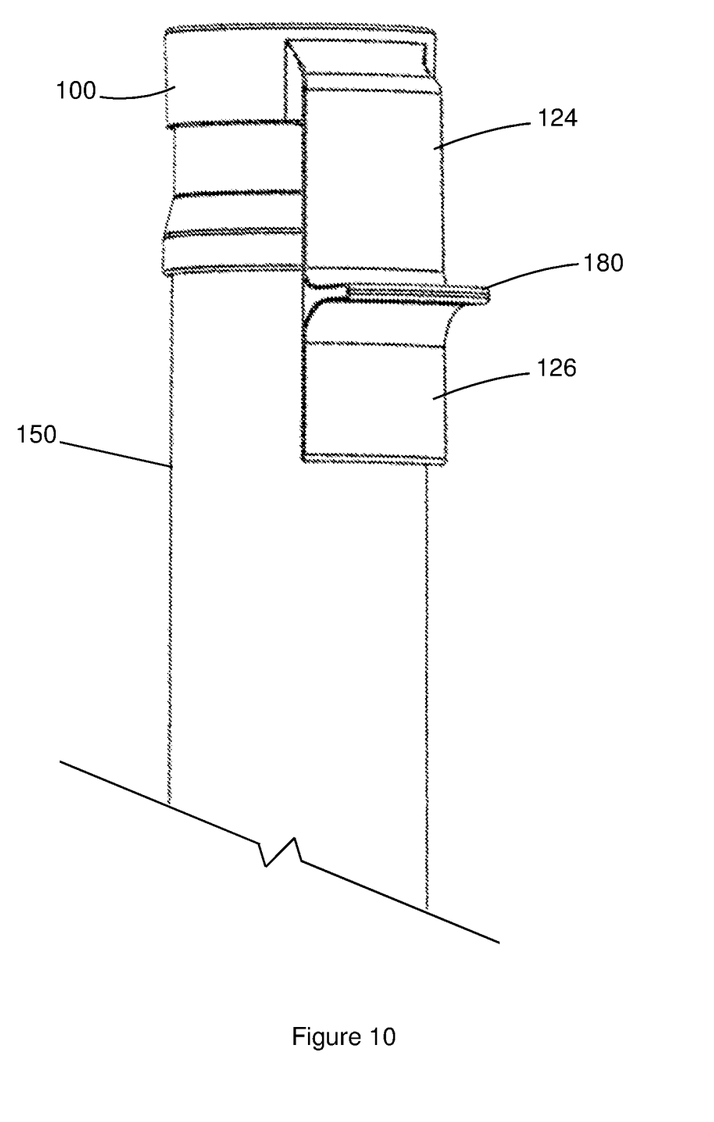
FIG. 10 illustrates a perspective view of the syringe tip cap in accordance with the second embodiment of the present disclosure placed on a syringe.

In a second aspect of the present disclosure, a tip cap 100 is disclosed that slips on prefilled syringes 150 having a luer tip. The tip cap 100 seals the fluid path and can act as a sterile barrier between the fluid path and the environment. The sealing surface of the tip cap has a circular symmetry around the axis that seals the fluid path of the prefilled syringe. Referring to FIGS. 8-10, a syringe tip cap 100 according to a second aspect of the present disclosure generally comprises an annular side wall 112 having an inside surface 114 defining a chamber 116 configured to accept an elongate tip syringe, an open proximal end 118 and a distal end 120 having a distal wall 122, a protruding boss 124 having a finger contact surface 126.

As shown in FIGS. 6-10, on the outer surface of the tip cap 100, starting from the top of the annular sidewall 112 of the tip cap 100 and extending in downward direction, there is a flat protruding boss 124 having a finger contact surface 126, which is used as a "handle" for removing the tip cap from a syringe assembly 150.

Figure 6:
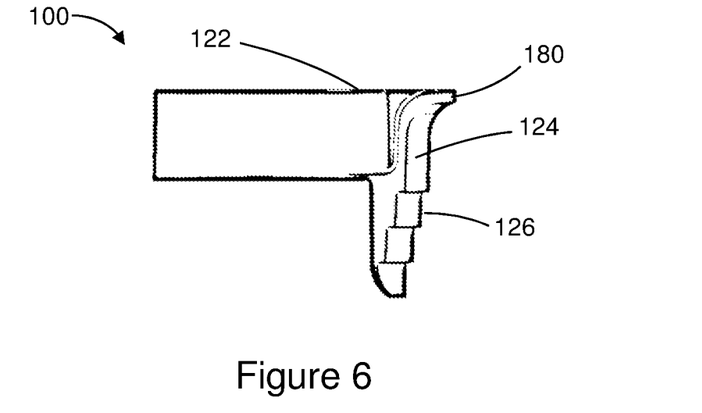
FIG. 6 illustrates a side view of an alternate embodiment of the syringe tip cap in accordance with the first embodiment of the present disclosure.
Figure 7:
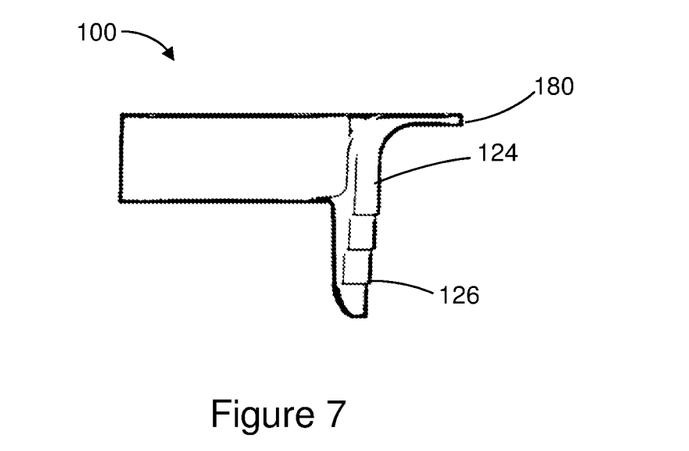
FIG. 7 illustrates a side view of yet another alternate embodiment of the a syringe tip cap in accordance with the first embodiment of the present disclosure.

In one or more embodiments, a finger stop 180 is disposed on the protruding boss 124. In one or more embodiments, as shown in FIGS. 6 and 7, finger stop 180 is disposed on the protruding boss 124 at the distal end of tip cap 100 protruding perpendicularly from the protruding boss 124. In one or more embodiments, as shown in FIGS. 6 and 7, the length of finger stop 180 may vary. In one or more embodiments, as shown in FIGS. 8-10, finger stop 180 is disposed along the length of protruding boss 124 near the center of protruding boss 124. As shown in FIGS. 8 and 9, finger stop 180 extends and protrudes perpendicularly from the surface of protruding boss 124, thereby forming a "T" with protruding boss 124. As shown in FIG. 10, when assembled to a prefilled syringe, the finger stop 180 is used as a thumb guard and both protruding boss 124 and finger stop 180 can be used to push the tip cap 100 in "upwards" or distal direction which will result in the tip cap 100 sliding off and being removed from the prefilled syringe 150. The finger stop 180 is positioned to prevent incidental contact with a distal tip of a syringe barrel.

In one or more embodiments, distal wall 122 may include a centrally situated collar (not shown) having a projecting side wall (not shown) forming an inside cavity (not shown) configured to envelope around an elongated tip of a syringe assembly, an open proximal end (not shown), and a distal end (not shown) adjacent the distal wall (not shown) of the tip cap 100. In one or more embodiments, the collar (not shown) is an outwardly extending protrusion from the inside surface of the distal wall (not shown) of the tip cap 100. In one or more embodiments, collar (not shown) is adapted for connection to an elongated tip or hub of a vascular access device.

Collar (not shown) seals the distal tip (not shown) of a syringe assembly (not shown) and prevents leakage when tip cap 100 is placed on the distal tip of a syringe assembly. The collar (not shown) prevents leakage after the syringe is filled and the cap 100 is closed until the cap 100 is opened prior to use. In one or more embodiments, collar may be in the shape of a pin or button. In one or more embodiments, the projecting side walls (not shown) of collar (not shown) may be tapered, orientated, configured and/or shaped to allow collar (not shown) to seal an opening of a distal elongated tip of a syringe or syringe assembly. Because of its shape, the tapered proximal end of the sidewall (not shown) of collar (not shown) helps facilitate the alignment of a distal tip of a syringe and thus reduce the chances of "touch" contamination. Collar (not shown) aids in aligning the elongated tip to other luer devices, such as needleless connectors, and protects the elongated tip from touch contamination. Absent the embodiments of the present disclosure, alignment of luer tips require careful attention and visual precision for being able to align the tip cap and the distal tip of the syringe perfectly such that no contamination occurs.

The projecting sidewalls (not shown) of collar 130 have a tapered proximal end (not shown) resulting in a tapered seal. The entrance angle of the tapered projecting sidewalls (not shown) of collar (not shown) and the entrance angle of the tapered interior wall surface of the annular sidewall of the tip cap produce a tapered seal between the tip cap and the distal end of the syringe 150, as well as, the barrel of the syringe. In one or more embodiments, the elongated tip of the syringe may be a luer tip. These seals ensure that both the interior cavity of the tip cap and distal end of the syringe are sterile and that the syringe is capped ensuring the pre-filled fluid of the syringe barrel is contained. This type of seal also makes one-handed removal feasible when combined with a "push off mechanism" that the user will use to remove the cap as described below.

In one or more embodiments, the internal diameter and taper angles of the tapered projecting sidewalls (not shown) of collar (not shown) and the tapered interior wall surface of the annular sidewall (not shown) of the tip cap 100 may be varied to affect interference fit with a syringe and thus improve the seal efficacy.

In one or more embodiments, projecting sidewalls (not shown) of collar (not shown) and the tapered interior wall surface of the annular sidewall (not shown) of the tip cap 100 ensure that the tip cap 100 can be removed by pushing off rather than unscrewing which is required when threads are involved. Depending on the interfaces on these surfaces, seals can be generated to ensure that entire area contained in the cavity (not shown) of the collar and chamber (not shown) of the tip cap 100 maintains container closure integrity.

Protruding boss 124 includes a finger contact surface 126 that extends from the annular sidewall 112 of the tip cap 100 for applying digital force to the finger contact surface 126 and finger stop 180 to allow the single-handed movement of the tip cap 100 from a closed sealed position to an open unsealed position to remove the tip cap from the barrel of the syringe. This is accomplished single-handedly by holding the syringe assembly sealed with tip cap 100 in one hand and applying a digital force to the finger contact surface 126 and finger stop 180 in a distal direction with the thumb or the index finger of the holding hand. The user is protected from inadvertent needle sticks by pushing the tip cap 100 distally using finger stop 180. In one or more embodiments, the finger contact surface may have a stepped, scalloped or graded configuration to improve grip configuration to improve grip when the user places a finger on the finger contact surface.

In one or more alternate embodiments, wedges or ribs (not shown) may be disposed on the inside surface of the distal wall (not shown) in an outwardly extending orientation from the collar to the inside surface of the annular wall (not shown). Wedges or ribs (not shown) may be arranged in hub and spoke fashion relative to the collar to resemble a small umbrella. Wedges or ribs (not shown) provide structural integrity to tip cap 100 and also help improve interference or friction fit with a distal end of syringe barrel and/or luer tip, such that, the frictional force due to the interference or friction fit will be greater than the forces applied to the tip cap 100 during any of the processes after the assembly (such as sterilization, shipping and handling etc.). In one or more embodiments, tip cap 100 can additionally include a gasket (not shown) on the inside surface of annular sidewall (not shown) of tip cap or on the exterior surface of collar (not shown) to create a tight seal for maintaining sterility.

As shown in FIG. 10, tip cap 100 will have an interference or friction fit with a distal end of syringe barrel 150 and/or luer tip, such that, the frictional force due to the interference or friction fit will be greater than the forces applied to the tip cap 100 during any of the processes after the assembly (such as sterilization, shipping and handling etc.). Yet, the frictional force will still be reasonably low so that users will be able to remove it with a single hand, such as, with the push of a thumb.

The material of the tip cap 100 has to be hard enough to retain its structural integrity when the tip cap is pushed axially during opening, and not bend or buckle. The syringe 150, tip cap 100 and collar 130 may be fabricated from suitable medical grade materials including polymers or metals. Preferably, tip cap 100 and collar 130 are injection-molded using a thermoplastic and/or thermoplastic elastomer (TPE).

Exemplary embodiments of the tip cap of the second aspect of the present disclosure offer one handed opening mechanism for a prefilled syringe. Tip cap 100 will have an interference with the syringe barrel and luer, such that, the frictional force due to the interference will be greater than the forces applied to the tip cap during any of the processes after the assembly (such as sterilization, shipping and handling etc.). Yet, the frictional force will still be reasonably low so that users will be able to remove tip cap 100 with a single hand, such as, with the push of a thumb.

The material of the tip cap 100 has to be hard enough to retain its structural integrity when the tip cap is pushed axially during opening, and not bend or buckle. The syringe 150, tip cap 100 and collar may be fabricated from suitable medical grade materials including polymers or metals. Preferably the caps are injection-molded using a thermoplastic and/or thermoplastic elastomer (TPE).

Figure 11:
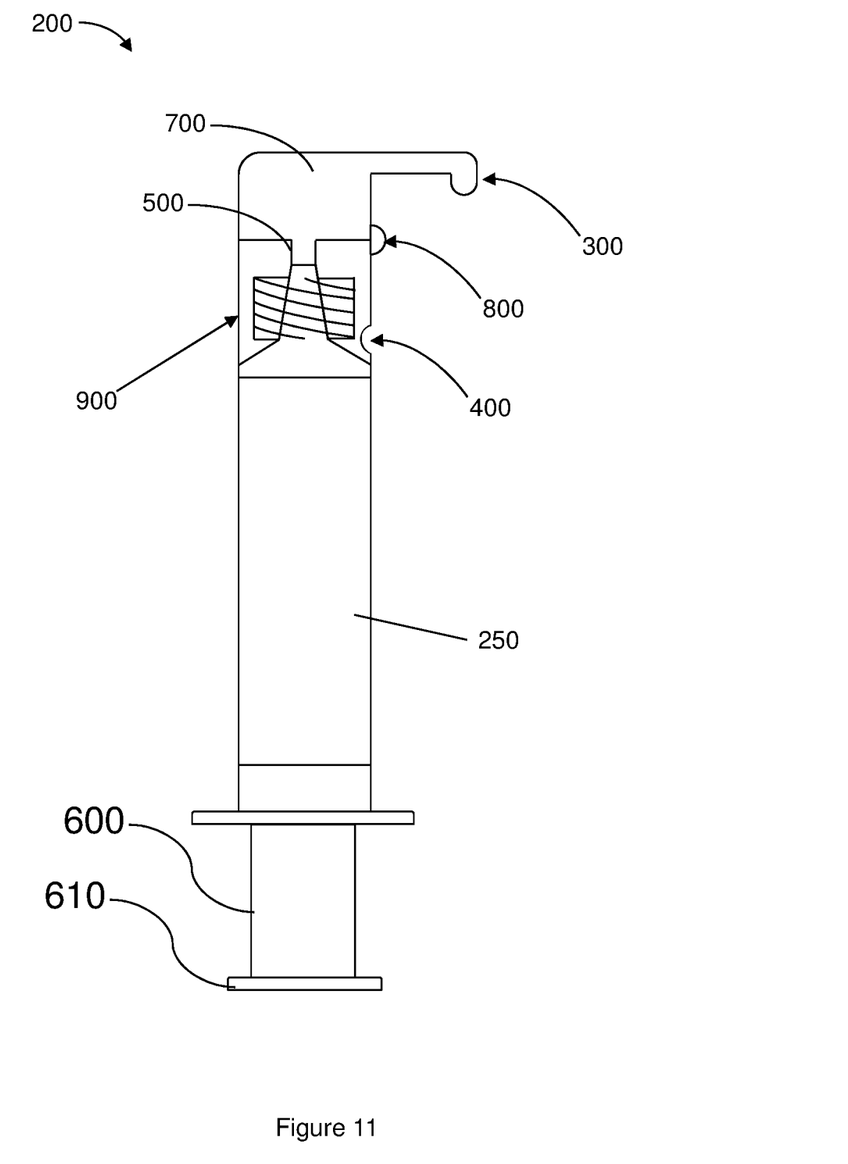
FIG. 11 illustrates a cross-sectional view of a syringe tip cap in accordance with a third embodiment of the present disclosure.

A third aspect of the present disclosure pertains to a tip cap 200 for a prefilled saline syringe with an extended barrel that shields the luer tip from accidental touch contamination during opening and connection to a needle-free connector. As shown in FIG. 11, tip cap 200 provides one-handed removal which allows the clinician to remove the cap with one hand, ensuring the connector can be held in the second hand without accidentally contaminating the connector hub or the luer tip when opening the syringe. Prior to use, as shown in FIG. 11, the tip cap 200 is secured using an interference fit that creates a sterile barrier and simultaneously allows the tip cap 200 to remain attached to the barrel of the syringe 250 after use. Once opened, locking arm 300 of the the tip cap locks into the notch 400 in the sidewall of barrel to prevent loose tip cap 200 from getting lost and to prevent clinicians from recapping the syringe.

As shown in FIG. 11, in one or more embodiments, tip cap 200 includes a lid 700 attached to the sidewall of the cap via a hinge 800 so that the tip cap 200 remains attached to the barrel of the syringe 250 after use which ensures that the tip cap 200 does not get lost among patient's bed, floor, etc. and that the syringe cannot be recapped for reuse.

In one or more embodiments, hinge 800 is a living hinge. In one or more embodiments, tip cap 200 is a flip open cap.

In one or more embodiments, tip cap 200 includes a side wall defining a longitudinal opening and a top wall between the side walls defining a recess having an interior surface. Tip cap 200 is capable of pivoting from an open position wherein the elongated tip of a syringe is exposed. In one or more embodiments, the collar 30 and the lid 700 can be molded together and then assembled with the barrel of a syringe. In one or more embodiments, the syringe barrel may include a protective sleeve 900 mounted on the distal wall of the barrel and surrounds the elongate tip. The protective sleeve 900 includes at least one side wall having an inside surface defining a compartment, an open distal end, a proximal end adjacent the distal wall of the barrel. The hinge 800 functions such that once the hinge 800 is opened, it remains in place. In one or more embodiments, the hinge 800 has a butterfly shape with a central section that serves as a hinge and the two wings on the sides to make it snap into place. It is also envisioned to altering the geometry of the hinge to create an easier attachment to the barrel. In one or more alternate embodiments, a "zip tie" like feature can be used to slide open the cap away from the luer tip.

In one or more embodiments, the hinge 800 opens between a fully closed position to a fully open position to the required degree of at least 120 degrees. In one or more embodiments, hinge 800 is an element that keeps the cap attached to the barrel after opening.

The locking arm 300 and notch 400 not only ensures that the tip cap 200 is not lost after use but also that the syringe is not recapped for another use. The locking arm 300 is wedged into the notch 400 disposed in the sidewall of the barrel using a press fit or snap in feature.

In one or more embodiments, the structure for automatically locking the tip cap 200 includes at least one locking arm 300 and notch 400 disposed in the exterior surface of the sidewall of the barrel or protective sleeve 900 extending around the distal tip. The locking arm 300 includes a free end positioned so that when the tip cap 200 is pivoted to the open position, the free end of the arm engages a corresponding mating locking notch 400 on the exterior surface of the collar.

The inside surface of the distal wall of the cap 200 has an outwardly extending protrusion 500 that blocks off the luer tip and prevents leakage when cap is closed. In one or more embodiments, protrusion 500 may be in the shape of a pin or button, as seen in FIG. 11. The outwardly extending protrusion 500 prevents leakage after the syringe is filled and the cap 200 is closed until the cap 200 is opened prior to use. In one or more embodiments, the outwardly extending protrusion or pin may be orientated, configured and/or shaped to allow the protrusion 500 to enter the opening at the distal end of the elongated tip, as seen in FIG. 11. Other embodiment can additionally include a gasket feature between the collar and the flip open cap to create a tight seal for maintaining sterility. In one or more embodiments, the elongated tip may be a luer tip.

The tip cap 200 opens in one step by the user pushing up with the thumb on finger stop 280. In one or more embodiments, finger stop 280 has surface texture to improve friction with the thumb of a user.

In one or more embodiments, the tip cap 200 is both easy to open by flipping it backwards (the thumb of the user moving away from the elongated tip) and the tip cap 200 is also sufficiently tight to provide minimum sterility assurance levels. The one-step opening process enables the user to disengage the tight seal in one step and allows easy removal of tip cap 200, as the tip cap 200 is designed to prevent the need for repositioning of the user's thumb during operation.

The tip cap 200 may be fabricated from suitable medical grade materials including polymers or metals. Preferably tip cap 200 is injection-molded using a thermoplastic and/or thermoplastic elastomer (TPE).

The syringe assembly (50, 150, 250) may be filled with flush solution using known methods. Additionally, the syringe assembly (50, 150, 250) may be provided pre-filled from the manufacturer or supplier. The flush solution may be any solution intended for flushing or maintaining performance of VAD's. It is preferred that the flush solution be selected from the group consisting of saline flush solution and heparin lock flush solution. These solutions are known in the art and are readily available. An example of a saline flush solution includes, but is not limited to, 0.9% sodium chloride USP for injection. An example of a heparin lock flush solution includes but is not limited to 0.9% sodium chloride with 100 USP units of heparin sodium per mL or 10 USP units of heparin sodium per mL.

FIG. 11 illustrates a perspective view of a flush syringe with a flip tip cap 200 in a closed position accordance with one or more embodiments of the present disclosure. As shown in FIG. 11, also provided are syringe assemblies that include a plunger rod and a syringe barrel having an open proximal end and a distal tip, the distal syringe tip surrounded by a protective sleeve to facilitate alignment of the syringe with tip cap 200, as well as, reducing contamination of the syringe by preventing contact of the syringe tip with the surrounding non-sterile environment.

The barrel may also include a tip which extends distally from the barrel. The tip of the barrel may include a luer slip connection or a locking luer type collar concentrically surrounding the tip or within the tip.

As shown in FIG. 11, an elongated plunger rod 600 may include a distal portion and a proximal portion. Elongate plunger rod 600 may be disposed within the barrel of syringe 250. The plunger rod 600 includes an elongate body portion with a proximal end and a distal end.

The elongate body portion of the plunger rod has an axial length extending from the proximal end to the distal end. The plunger rod may also include a thumbpress 610 at the proximal end of the elongate body portion. The shape of the thumbpress can vary depending on the desired usage of the flush syringe assembly. The shape of the thumbpress may be round, square, rectangular, triangular, oval, pentagonal, hexagonal and cruciform.

The plunger rod is slidably positioned in the barrel so that the stopper is in fluid-tight contact with the inside surface of the barrel and so that distal movement of the plunger rod relative to the barrel causes the stopper to push the fluid out of the barrel. In some embodiments, the stopper is slidably positioned in fluid-tight contact with the inside surface of the barrel for driving fluid out of the chamber by movement of the stopper relative to the barrel.

The plunger rod may be made of material which is more rigid than the stopper such as polypropylene, polyethylene and the like. Materials should be chosen to be compatible with the procedure being used.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as disclosed.

What is claimed is:

1. A syringe tip cap comprising:
   a body having an annular side wall having an inside surface defining a chamber, an open proximal end, a closed distal end including a distal wall;
   a protruding boss having a finger contact surface that extends from the annular sidewall of the tip cap away from the annular sidewall, the finger contact surface is configured for applying a digital force to the finger contact surface in a distal direction with a thumb or an index finger of a holding hand of a user and is configured to allow the single-handed movement of the tip cap from a closed sealed position to an open unsealed position;
   the chamber configured to accept an elongate tip syringe;
   and the distal wall includes a collar disposed on an inner surface of the distal wall, the collar having a projecting sidewall enveloping and fluidly sealing the distal tip, the projecting sidewall of the collar having an internal dimension configured to create an interference fit with a distal tip of the elongate tip syringe.

2. The syringe tip cap of claim 1, wherein the collar includes one or more tapered proximal ends on the projecting sidewall.

3. The syringe tip cap of claim 1, wherein the annular side wall includes one or more tapers.

4. The syringe tip cap of claim 1, wherein the finger contact surface has a stepped, scalloped or graded configuration to improve grip.

5. The syringe tip cap of claim 1, further comprising a finger stop disposed on the protruding boss.

6. The syringe tip cap of claim 5, wherein the collar includes one or more tapered projecting sidewalls.

7. The syringe tip cap of claim 5, wherein the annular side wall includes one or more tapers.

8. The syringe tip cap of claim 5, wherein the finger contact surface has a stepped, scalloped or graded configuration to improve grip.

9. The syringe tip cap of claim 5, wherein the finger stop is disposed on the protruding boss at the distal end of the body of the syringe tip cap.

10. The syringe tip cap of claim 5, wherein the finger stop is disposed along a length of protruding boss near the center of protruding boss.

11. The syringe tip cap of claim 1, further includes a protrusion in the shape of a centrally situated pin or button.

12. The syringe tip cap of claim 11, wherein the protrusion is disposed on the inside surface of the distal wall and extends proximally into the inside cavity.

13. The syringe tip cap of claim 11, wherein the protrusion is sized and configured to fluidly block a lumen of the elongated tip of the syringe.

14. The syringe tip cap of claim 13, wherein the protrusion has a diameter corresponding to a diameter of the lumen of the elongated tip configured to fluidly cover the lumen.

* * * * *